(12) United States Patent
Komagamine et al.

(10) Patent No.: US 7,123,274 B2
(45) Date of Patent: Oct. 17, 2006

(54) COMBINING DRAWING SYSTEM, COMBINING DRAWING METHOD, AND RECORDING MEDIUM

(75) Inventors: Katsumi Komagamine, Nagano (JP); Tatsuro Oshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 132 days.

(21) Appl. No.: 10/652,614

(22) Filed: Sep. 2, 2003

(65) Prior Publication Data
US 2005/0039120 A1 Feb. 17, 2005

(30) Foreign Application Priority Data
Sep. 2, 2002 (JP) ............ p2002-256930

(51) Int. Cl.
*G09G 5/00* (2006.01)
(52) U.S. Cl. .................................... 345/629
(58) Field of Classification Search ......... 345/629–641
See application file for complete search history.

(56) References Cited

U.S. PATENT DOCUMENTS

| | | | | |
|---|---|---|---|---|
| 5,003,499 | A * | 3/1991 | Fujiwara et al. ............ | 715/520 |
| 5,051,930 | A * | 9/1991 | Kuwabara et al. .......... | 715/516 |
| 6,263,093 | B1 * | 7/2001 | Mochizuki ................... | 382/128 |
| 6,429,871 | B1 * | 8/2002 | Katsura et al. ............. | 345/501 |
| 6,441,918 | B1 * | 8/2002 | Hori ........................... | 358/1.16 |
| 6,766,343 | B1 * | 7/2004 | Bell et al. ................... | 708/442 |
| 6,928,610 | B1 * | 8/2005 | Brintzenhofe et al. ...... | 715/517 |
| 2003/0187625 | A1 * | 10/2003 | Deguchi ....................... | 703/6 |
| 2004/0174359 | A1 * | 9/2004 | Takagi ........................ | 345/420 |
| 2005/0022122 | A1 * | 1/2005 | Barrus et al. ............... | 715/530 |
| 2005/0041042 | A1 * | 2/2005 | Rajarajan et al. .......... | 345/629 |
| 2005/0144256 | A1 * | 6/2005 | Blumberg .................... | 709/217 |

FOREIGN PATENT DOCUMENTS

| | | | |
|---|---|---|---|
| JP | WO 02/23408 | * | 3/2002 |
| WO | WO 90/14627 | * | 11/1990 |

* cited by examiner

*Primary Examiner*—Ulka Chauhan
*Assistant Examiner*—Eric Woods
(74) *Attorney, Agent, or Firm*—Sughrue Mion, PLLC

(57) ABSTRACT

A combining drawing system includes storage means for storing a template defining a plurality of temporary coordinate systems A and B, the template defining a plurality of layout coordinates E, F, G, H, and J defined in any of the temporary coordinate systems; output setting means for setting a conversion parameter for converting the temporary coordinate system into an output coordinate system of a coordinate system of a drawing space; object input means for inputting at least one of objects output using the template; and output means for laying out the objects input through the object input means in the layout coordinates defined in the output coordinate system based on the template and the conversion parameter to create a composite image and expressing the created composite image in the drawing space.

1 Claim, 13 Drawing Sheets

FIG. 5

```
[HEADER]
HdTitle="Script Sample"
HdDirection=Vertical
HdMargines=3, 3, 3, 3
[PAGE]
DrawPicture (1, "","1", 50, 25, 300, 180, 0, 0, 0, "")
DrawPicture (1, "","2", 100, 75, 275, 170, 0, 0, 0, "Shape. jpg")
DrawPicture (1, "haikei.jpg", "", 400, 25, 475, 75, 0, 0, 0, "")
DrawPicture (1, "","3", 375, 100, 475, 175, 0, 0, 0, "")
Group (1, 0, 0, 50, 25, 550, 300)
DrawPicture (2, "","1", 25, 25, 275, 75, 0, 0, 0, "")
Group (2, 0, 3, -350, -130, -50, -30)
```

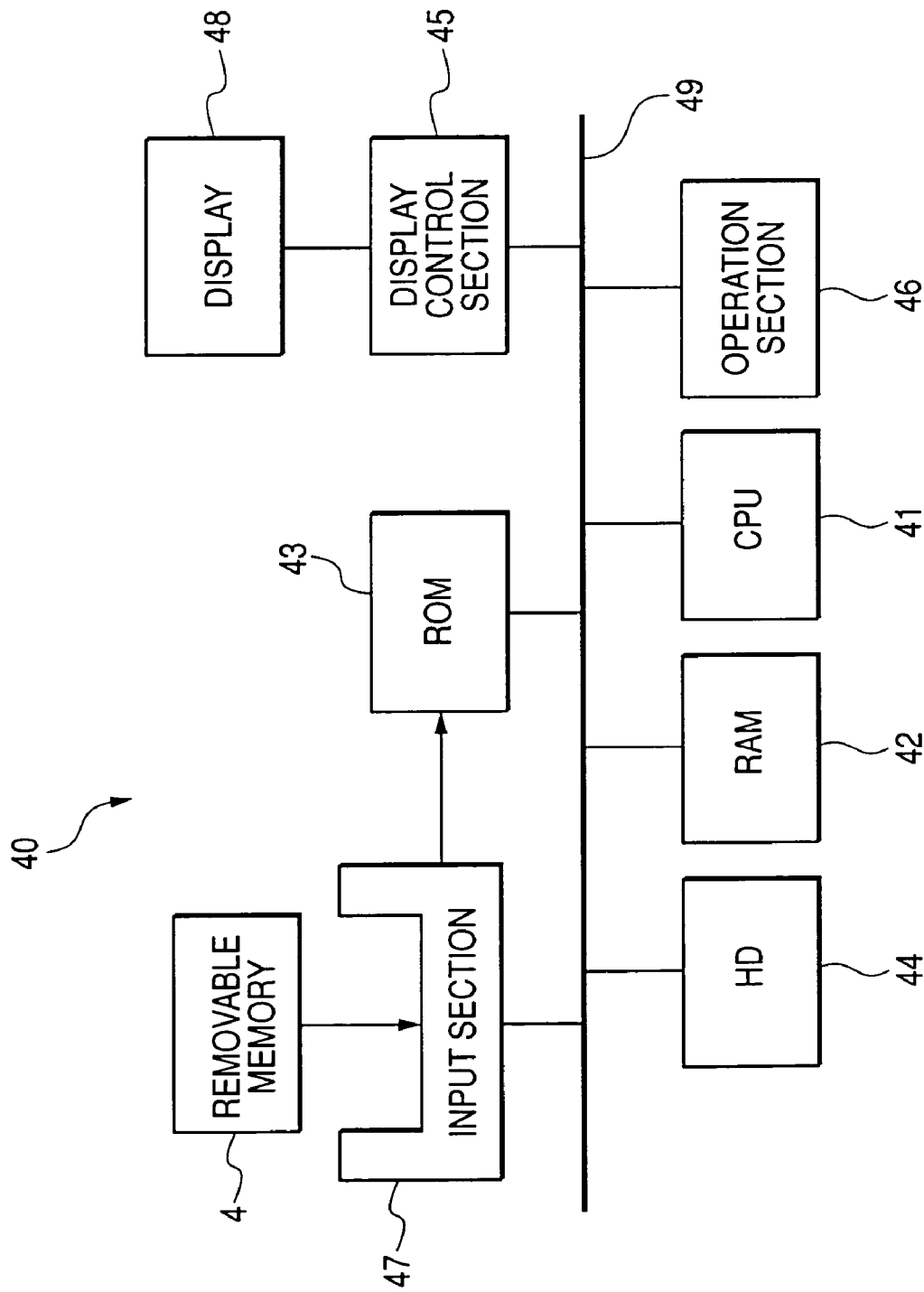

COMBINING DRAWING SYSTEM, COMBINING DRAWING METHOD, AND RECORDING MEDIUM

BACKGROUND OF THE INVENTION

This invention relates to a combining drawing system for combining a plurality of objects to form one composite drawing.

Hitherto, a combining drawing system for combining a plurality of objects such as images and text for print, display, etc., has been known. In the combining drawing system, generally a template is used to draw user-entered objects in a predetermined layout.

The template describes information to specify a rectangular drawing area and layout coordinates indicating where each object is laid out for the rectangular drawing area. Specifically, for example, a print template is defined for each print paper size and for each orientation (portrait or landscape), etc., and describes information to specify the paper size and orientation and the object layout coordinates. Generally, the layout coordinates are defined by a coordinate system with the upper-left corner of a rectangular drawing area as the origin point.

However, with a template in a related art, if a rectangular drawing area fluctuates at the output time, it is feared that an object may extend off the rectangular drawing area. Specifically, for example, if a template to print with an image placed in the whole of paper of a certain size and a title character string placed in the lower-right corner of the paper is used to print on paper smaller than the paper defined in the template, the right margin and the lower margin of the image and the title character string extend off the paper.

If a template defines the layout of a plurality of objects, the relative positions between the objects may vary depending on the output device difference. For example, if a template defines the layout of a plurality of variables corresponding to a plurality of rectangular frames making up a zip code entry frame and digits making up a zip code, the relative positions of the zip code entry frame and the zip code may be misaligned depending on the printer difference. To align a zip code entry frame and a zip code in a printer, a plurality of rectangular frames making up the zip code entry frame and the digits 0 to 9 making up the zip code need to be aligned separately. Thus, to set parameters required for relative alignment among a large number of objects, a complicated man-machine interface becomes necessary.

SUMMARY OF THE INVENTION

It is therefore an object of the invention to provide a combining drawing system, a combining drawing method, a combining drawing program, and a recording medium for making it possible to preset the layout of a plurality of objects for an undefined drawing area.

It is another object of the invention to provide a combining drawing system for making it possible to easily correct the relative positional relationship among preset objects.

According to the invention as claimed in claim 1, there is provided a combining drawing system including storage means for storing a template defining a plurality of temporary coordinate systems, the template defining a plurality of layout coordinates defined in any of the temporary coordinate systems; output setting means for setting a conversion parameter for converting the temporary coordinate system into an output coordinate system of a coordinate system of a drawing space; object input means for inputting at least one of objects output using the template; and output means for laying out the objects input through the object input means in the layout coordinates defined in the output coordinate system based on the template and the conversion parameter to create a composite image and expressing the created composite image in the drawing space. According to the combining drawing system as claimed in claim 1, a plurality of objects whose layout is defined by different temporary coordinate systems are separately laid out for a drawing area based on the conversion parameter, so that the layout of a plurality of objects can be preset for an undefined drawing area.

The combining drawing system as claimed in claim 2 is characterized by the fact that the layout coordinates defined in the template are defined by any of group coordinate systems whose origin point is defined in any of the temporary coordinate systems. According to the combining drawing system as claimed in claim 2, a plurality of origin points can be set to any desired positions of the drawing area by the temporary coordinate system and the positions of a plurality of objects can be set in the same group coordinate system with any origin point as the reference. The objects whose layout coordinates are defined in the same group coordinate system can be moved together as the origin point of the group coordinate system is moved. Therefore, the combining drawing system as claimed in claim 2 makes it possible to easily correct the relative positional relationship among preset objects.

The combining drawing system as claimed in claim 3 is characterized by the fact that the output means clips a plurality of objects laid out in the layout coordinates defined in the same group coordinate system based on a clipping mask defined for each of the group coordinate systems in the template. According to the combining drawing system as claimed in claim 3, an image into which a plurality of objects containing the user-entered object are combined can be clipped after the user enters the object. Thus, any desired part of the user-entered object can be laid out as desired in the expression range in the drawing space while the relative positional relationship with any other object defined in the same group coordinate system is maintained.

The combining drawing system as claimed in claim 4 is characterized by the fact that the temporary coordinate system has the origin point converted into any of the four corners or the center of a rectangular drawing area defined in the output coordinate system, that the output setting means has print setting means for entering a paper size and sets the conversion parameter based on the entered paper size, and that the output means prints the composite image on a print medium. According to the combining drawing system as claimed in claim 4, when the paper size is entered, a plurality of objects are laid out for paper based on two or more of the four corners and the center of the paper of the entered size, so that the layout of a plurality of objects can be preset for an undefined paper size.

The combining drawing system as claimed in claim 5 is characterized by the fact that it further includes menu display means for displaying a menu for entering the template. According to the combining drawing system as claimed in claim 5, a template can be easily added. The combining drawing system as claimed in claim 5 enables the user to easily draw composite images in various layouts using the templates created by other persons.

The functions of the plurality of means of the invention are implemented as hardware resources having functions defined by the configuration itself, hardware resources having functions defined by a program, or a combination thereof. The functions of the plurality of means are not limited to those implemented as hardware resources physically independent of each other.

The invention can be defined not only as the invention of an apparatus, but also as the invention of a program, the invention of a recording medium recording the program, the invention of a method, and the invention of a recording medium recording a template.

BRIEF DESCRIPTION OF THE DRAWINGS

In the accompanying drawings:

FIG. 5 is a drawing to show a template of the combining drawing system according to the first embodiment of the invention.

FIG. 14 is a block diagram of the combining drawing system according to the second embodiment of the invention.

DETAILED DESCRIPTION OF THE PREFERRED EMBODIMENTS

Figure 1:
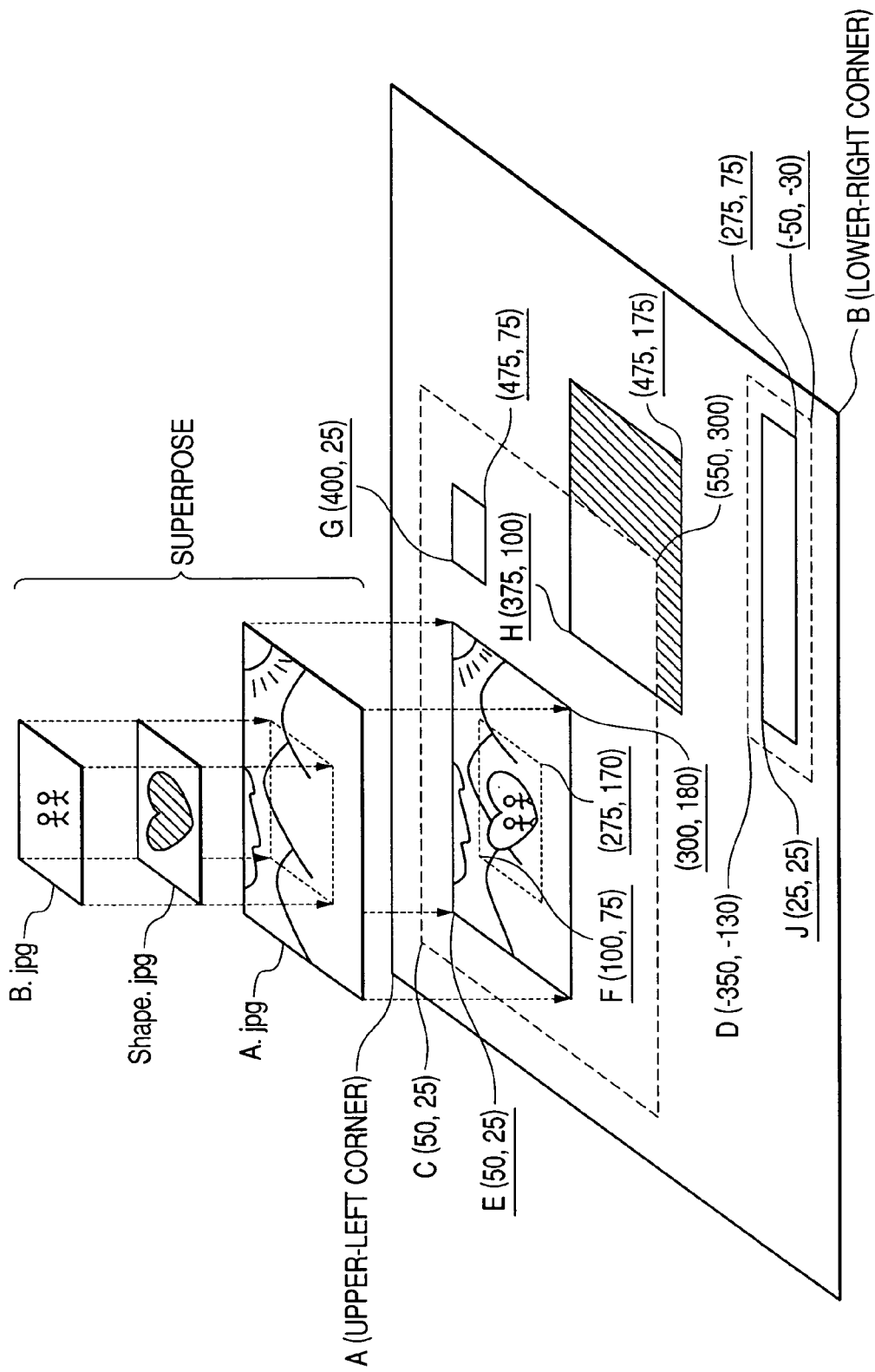
FIG. 1 is a conceptual drawing of a template in a combining drawing system according to a first embodiment of the invention.

Referring now to the accompanying drawings, there are shown preferred embodiments of the invention.

(First Embodiment)

In a first embodiment of the invention, an example wherein a composite image is printed on print paper will be discussed. Therefore, in the first embodiment, drawing space refers to print paper and expression means print. In the description that follows, drawing area refers to a rectangular area defined in the drawing space in an output coordinate system of a drawing space coordinate system, and a composite image is printed in the drawing area.

Figure 2:
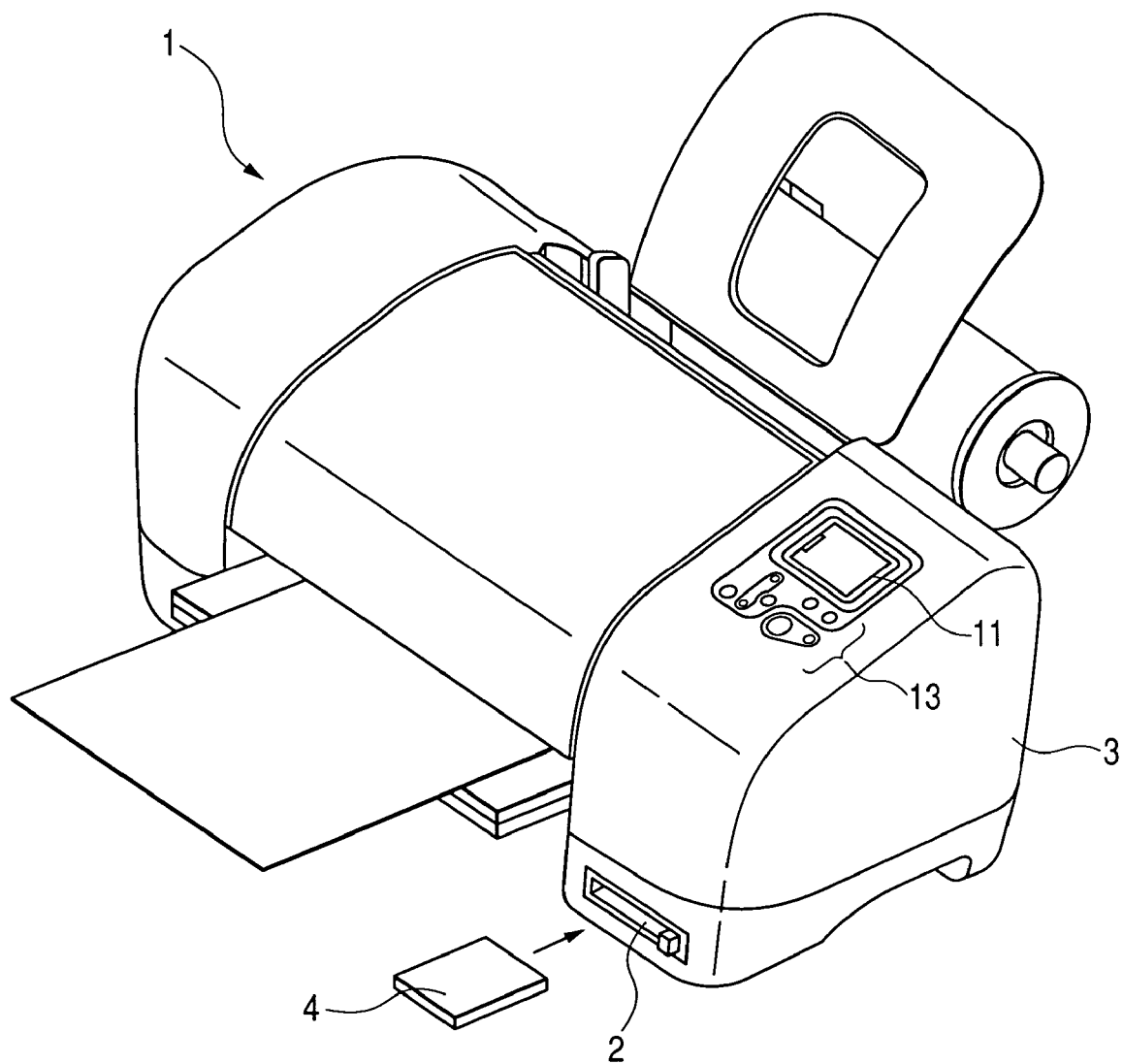
FIG. 2 is a perspective view to show the appearance of the combining drawing system according to the first embodiment of the invention.
Figure 3:
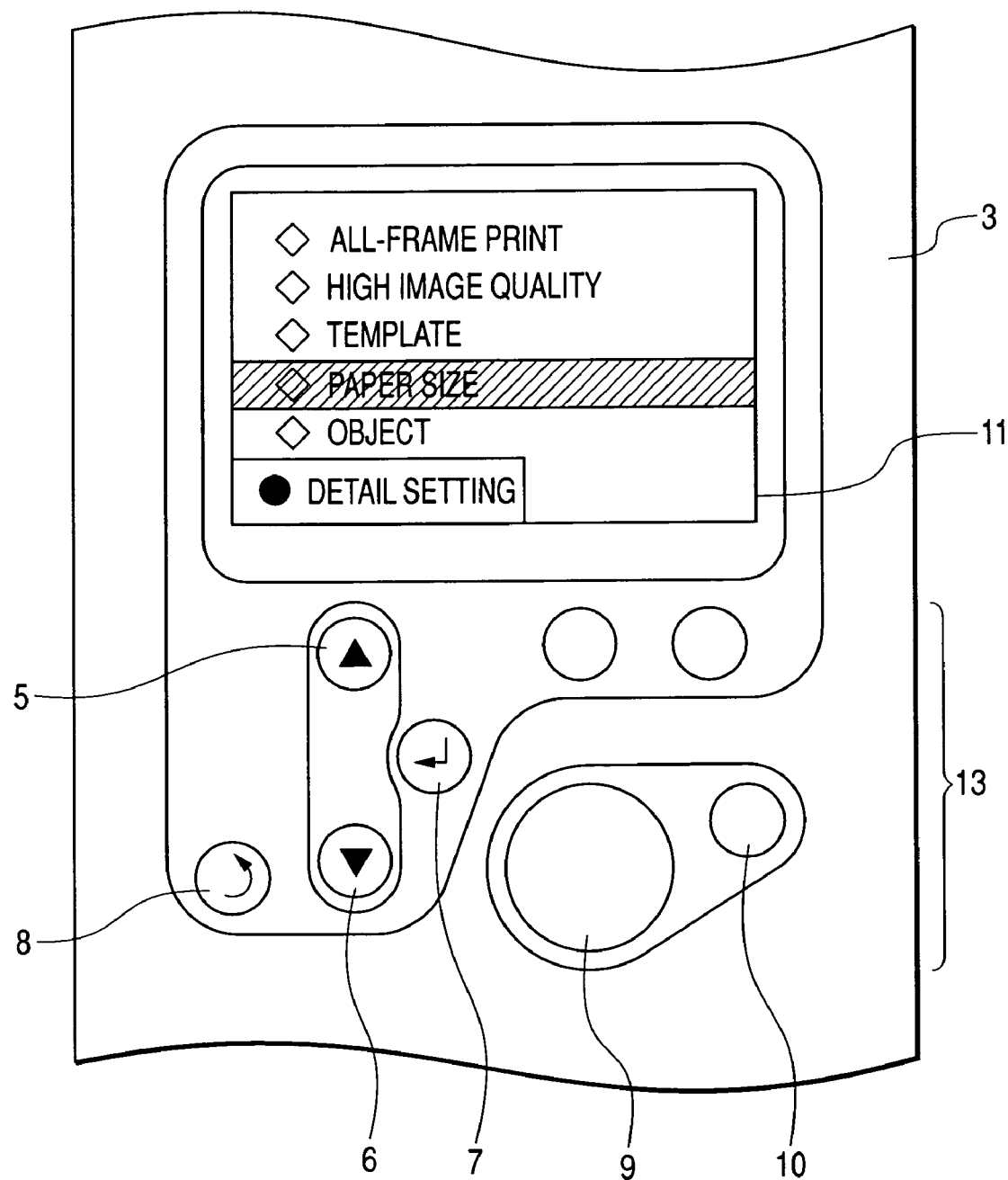
FIG. 3 is an enlarged view of a display and an operation section of the combining drawing system according to the first embodiment of the invention.

FIG. 2 is a perspective view to show the appearance of a printer 1 as a combining drawing system according to the first embodiment of the invention. FIG. 3 is an enlarged view of a display 11 and an operation section 13 of the printer 1.

A card slot 2 is an opening to connect removable memory 4 detachably to an input section (not shown) provided in a housing 3.

As shown in FIG. 3, a display 11, an operation section 13, and the like are provided on the housing 3, and the operation section 13 includes a plurality of switches such as an upper switch 5, a lower switch 6, a determination switch 7, a return switch 8, a print start switch 9, and a cancel switch 10. A menu for the user to set is displayed on a display 13. The upper switch 5, the lower switch 6, the determination switch 7, and the return switch 8 are switches for the user to select menu items. The print start switch 9 is a switch for the user to enter a print start command. The cancel switch 10 is a switch for the user to enter a print cancel command.

The housing 3 houses a power supply circuit, a control circuit, a drive circuit, an actuator, and the like making up print means.

Figure 4:
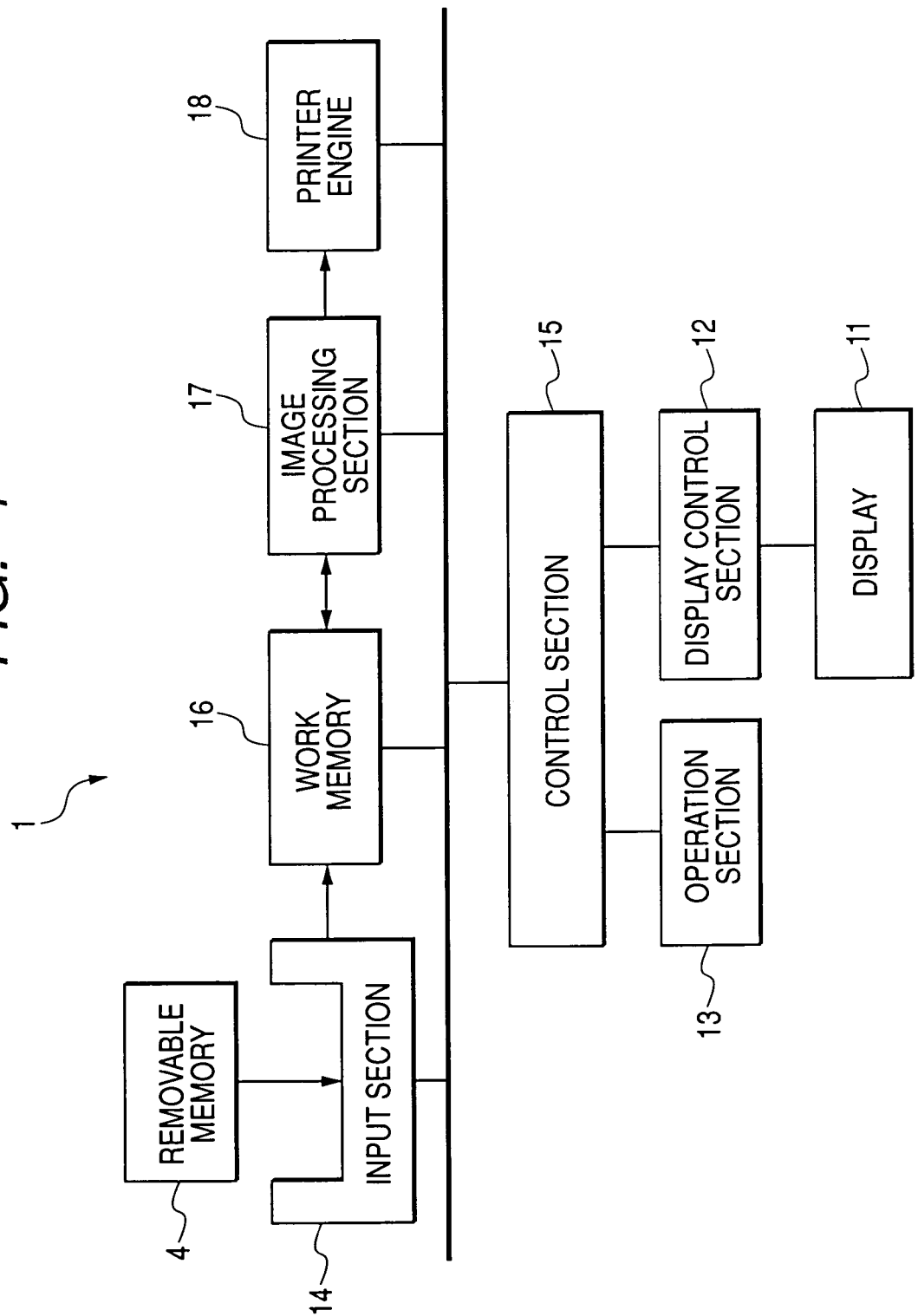
FIG. 4 is a block diagram of the combining drawing system according to the first embodiment of the invention.

FIG. 4 is a block diagram of the printer 1.

The display 11 is implemented as an LCD (liquid crystal display), etc., and is controlled by a display control section 12. The display control section 12 includes VRAM, a drive circuit, etc. The display control section 12 displays the composite image stored in the VRAM on the display 11 under the control of a control section 15.

An input section 14 reads a file defining an object of an image, text, etc., stored in the removal memory 4, which will be hereinafter referred to as object file, a template, etc., and stores the read file, template, etc., in work memory 16 under the control of the control section 15. The removal memory 4 is a recording medium that can be attached to and detached from the input section; specifically it is card-type flash memory that can be attached to and detached from a digital camera, for example.

An image processing section 17 is an ASIC for executing processing for converting data stored in work memory 16 into print data in cooperation with the control section 15. Which of the processing section 15 and the image processing section 17 is to perform the processing for converting data into print data is a design item. Specifically, for example, the image processing section 17 executes decompression processing, gamma correction, color space conversion processing, resolution conversion processing, halftone processing, interlace processing, etc., for the image data stored in the work memory 16.

A printer engine 18 forms an image on print paper based on print data provided by the image processing section 17 under the control of the control section 15. The printer engine 18 forms an image on print paper according to a system such as ink jet, laser, sublimatic thermal transfer, or dot impact, for example.

The control section 15 includes a CPU and ROM. The CPU executes a combining drawing program stored in the ROM to create a composite image and causes the printer engine 18 to print the composite image. The ROM is memory previously storing the combining drawing program, various pieces of data, etc.

FIG. 1 is a conceptual drawing to show a template defining a plurality of temporary coordinate systems. The template defines a plurality of group coordinate systems and a plurality of layout coordinates in addition to the plurality of temporary coordinate systems.

Points A and B are the origin points of different temporary coordinate systems. For the template intended for a rectangular drawing area, the origin point of the temporary coordinate system is not specified by coordinates and is specified by the position such as the upper-left corner, the upper-right corner, the lower-left corner, the lower-right corner, or the center. The upper-left corner, the upper-right corner, the lower-left corner, the lower-right corner, the center, or the like is a point that can be determined in any rectangular drawing area independently of the size, the aspect ratio, etc. If the origin point of the temporary coordinate system is set to any of the four corners or the center, the coordinates corresponding to the origin point of the temporary coordinate system can be uniquely determined in the output coordinate system of the drawing area into which the temporary coordinate system is converted.

Coordinates C (50, 25) and coordinates D (−350, −130) are the origin points of different group coordinate systems. Each of the origin points of the group coordinate systems is defined in any temporary coordinate system; the coordinates C are defined in the temporary coordinate system with the upper-left corner (point A) as the origin point, and the coordinates D are defined in the temporary coordinate system with the lower-right corner (point B) as the origin point. To define a group coordinate system, absolute specification or relative specification can be selected. The absolute specification and the relative specification are described later.

Coordinates E (50, 25), coordinates F (100, 75), coordinates G (400, 25), coordinates H (375, 100), and coordinates J (25, 25) are layout coordinates. The layout coordinates are coordinates indicating the layout position of an object such as an image, a background image, or a comment. The layout coordinates are defined by the offset value from the origin point of the group coordinate system. For example, the layout coordinates E, F, G, and H are defined in the group coordinate system with the coordinates C as the origin point; in other words, the coordinates are defined as the offset values from the coordinates C. The offset value may be positive or negative. A plurality of layout coordinates can be defined in one group coordinate system. That is, the positions of a plurality of objects can be defined in the same group coordinate system. The objects whose layout coordinates are defined in the same group coordinate system can be moved together as the origin point of the group coordinate system is moved. For example, if the relative positions of the zip code entry frame and the zip code are misaligned because of the difference between the printer 1 and any other printer, the rectangular frames making up the zip code entry frame are assumed to be objects and their layout coordinates are defined in the same group coordinate system. The digits making up the zip code are also assumed to be objects and their layout coordinates are defined in one group coordinate system different from that of the zip code entry frame. In doing so, if the position of the origin point of the group coordinate system defining the zip code is moved, the seven-digit zip code can be moved in batch and the misalignment can be easily corrected.

FIG. 5 is a drawing to show the script defining the template shown in FIG. 1. In a template 20, the row beginning with DrawPicture is a row defining layout coordinates. The layout coordinates are described in the following format:

DrawPicture (GroupID, "FileName," "PhotoID,"
　　FrameX1, FrameY1, FrameX2, FrameY2,
　　Direction, Fitting, Alignment, Shape)

Here, GroupID is a field specifying the identification number of the group coordinate system defining the layout coordinates. FileName is a field specifying the filename of a defined object. The defined object is an object previously retained together with the template 20; it is provided by the creator of the template 20 so that the defined object is combined with a user-entered object for output, such as a background image or a typical comment, for example. PhotoID is a field specifying the priority of the layout coordinates. The creator of the template 20 can assign priorities to the layout coordinates in the same template. If it is made possible to assign the priorities, the creator of the template 20 can specify which layout coordinates the object is to be assigned to first. The priorities may be assigned duplicately. The same object is assigned to the layout coordinates having the same priority. The FileName and PhotoID fields are complementary to each other; an effective value must be specified in one of the fields and the other field must be blank. FrameX1 is a field specifying the X coordinate of the layout coordinates in the group coordinate system, and FrameY1 is a field specifying the Y coordinate of the layout coordinates in the group coordinate system. FrameX2 and FrameY2 are fields specifying the lower-right point of the rectangular frame with the layout coordinates as the upper-left corner, and the object is laid out in the rectangular frame.

Direction is a field specifying the orientation of the object to be laid out; the rotation angle such as 0 (no rotation), 90 (90-degree rotation), or 180 (180-degree rotation) can be specified. Fitting is a field specifying handling if the size of the object does not match the size of the rectangular frame; for example, 0 (the upper-left corner of the object is matched with the layout coordinates), 1 (the center of the object is matched with the center of the rectangular frame), 2 (the center of the upper side of the object is matched with the center of the upper side of the rectangular frame), or the like can be specified. Shape is a field specifying the file name of $\alpha$ channel data. The $\alpha$ channel data is data used to superimpose one image on another; it is not specified if superimposition is not performed. The $\alpha$ channel data is described later.

The template 20 is interpreted in order starting at the top row. Therefore, if a partial area of the rectangular frame of the layout coordinates overlaps the area of the rectangular frame of different layout coordinates, a part of the object laid out in the layout coordinates earlier interpreted is overwritten with the object laid out in the layout coordinates later interpreted. Therefore, for example, to surely print the whole of one object, if the object is assigned to the last interpreted layout coordinates, the whole of the object can be printed.

In the template 20, the row beginning with Group is a row defining the group coordinate system. The group coordinate system is described in the following format:

Group (GroupID, AbsoluteFlag, Origin, FrameX1,
　　FrameY1, FrameX2, FrameY2)

Here, GroupID is a field specifying the identification number to uniquely identify the group coordinate system. AbsoluteFlag is a field specifying either 0 (absolute specification) or 1 (relative specification). Origin is a field specifying the origin point of the temporary coordinate system defining the origin point of the group coordinate system; any of 0 (upper-left corner), 1 (upper-right corner), 2 (lower-left corner), 3 (lower-right corner), or 4 (center) is specified. FrameX1 is a field specifying the X coordinate of the origin point of the group coordinate system in the temporary coordinate system, and FrameY1 is a field specifying the Y coordinate of the origin point of the group coordinate system in the temporary coordinate system. FrameX2 and FrameY2 are a clipping mask. To perform clipping, the coordinates of the lower-right corner of the rectangular frame with the origin point of the group coordinate system as the upper-left corner are specified in FrameX2 and FrameY2. To suppress clipping, 0 is set in FrameX2 and FrameY2. The clipping is described later.

Next, image superimposition using the α channel data will be discussed. If Shape is specified on a DrawPicture row, a superposed composite image is created using the object laid out in the layout coordinates defined on the DrawPicture row as a first image and the object laid out in the layout coordinates defined on the DrawPicture row immediately prceding that DrawPicture row as a second image.

In the example schematically shown in FIG. 1, "A.jpg" is the second image, "B.jpg" is the first image, and "Shape.jpg" is the α channel data.

The α channel data is data in JPEG format. Although the general JPEG-format data is made up of three channels of Y (luminance component), Cb (blue component), and Cr (red component), the α channel data is only one channel and the α data is stored in the channel. The α channel data may be described in a format other than the JPEG format, such as BMP, Tiff, or PNG. The superposed composite image is created by converting the Y, Cb, Cr color space into R, G, B color space and then calculating the transmittance according to the following expression:

$$R'=$$

where R', G', and B' are RGB values of the superposed composite image, and $R_p$, $G_p$, and $B_p$ are the RGB values of the first image data. $R_t$, $G_t$, and $B_t$ are the RGB values of the second image data. α is the value of the α data. As seen from the expression, if the value of the α data is 255, the value of the first image data is selected and if the value of the α data is 0, the value of the second image data is selected. Otherwise, their composite value is selected. For the α channel data schematically shown in FIG. 1, 255 is set in the α data corresponding to the hatched area and 0 is set in the α data corresponding to the void area. Therefore, the first image is cut out to the shape set based on the α channel data and is combined with the second image, as shown in the figure. Accordingly, the superposed composite image is created. The created superposed composite image is laid out as the object in the layout coordinates defined on the immediately preceding DrawPicture row.

The size of the outer frame of the α channel data in the first embodiment is smaller than that of the outer frame of the second image, as shown in FIG. 1, because the α channel data is laid out for the same range as the layout range of one of the images combined according to the DrawPicture script. That is, since the layout range of the α channel data is defined according to the DrawPicture script, for the outside of the layout range of the α channel data, the values of all pixels of the other image to be combined may be selected as the values of the pixels of the superposed composite image and thus the α channel data for all pixels of the other image to be combined need not be defined. Therefore, the α channel data in the first embodiment makes it possible to lessen the data amount as compared with the α channel data representing the area of the same size as the second image. Further, the size of the outer frame is smaller than the second image data, so that the position of the second image for which the first image is to be laid out can be changed as desired. That is, the relative position of the first image to the second image can be determined as desired. For example, if the size of the outer frame of the α channel data is the same as the size of the outer frame of the second image, the α channel data cannot be moved and to change the layout position, different α channel data must be provided. If the size of the outer frame of the α channel data is smaller than the size of the outer frame of the second image, the layout position can be set as desired in the range of the outer frame of the second image without providing different α channel data.

Next, the clipping will be discussed. The clipping is to remove the pixels extending off the area defined based on a clipping mask. The group coordinate system can be set as a rectangular area, as described above. If the rectangular frame is large like layout coordinates H, for example, as shown in FIG. 1, a part of the rectangular frame extends off the rectangular frame of the group coordinate system. In this case, the clipping is performed. As shown in the figure, the hatched portion of the rectangular frame of the coordinates H extends off the area of the group coordinate system and the object laid out in the layout coordinates is clipped in the portion corresponding to the hatched portion. The clipping mask is defined for each group coordinate system and when the clipping mask is set, the clipping is performed for a plurality of objects laid out in the layout coordinates defined in the same group coordinate system. If the clipping is performed, the portion extending off the area is removed, so that if the user enters a large-sized object, it does not affect any object whose layout is defined in a different group coordinate system laid out beyond the range of the clipping mask of the group coordinate system. Thus, any desired part of the object entered by the user can be laid out as desired in the expression range in the drawing space while the relative positional relationship with any other object defined in the same group coordinate system is maintained.

Next, conversion of a temporary coordinate system to an output coordinate system will be discussed with respect to absolute specification and relative specification.

Figure 6:
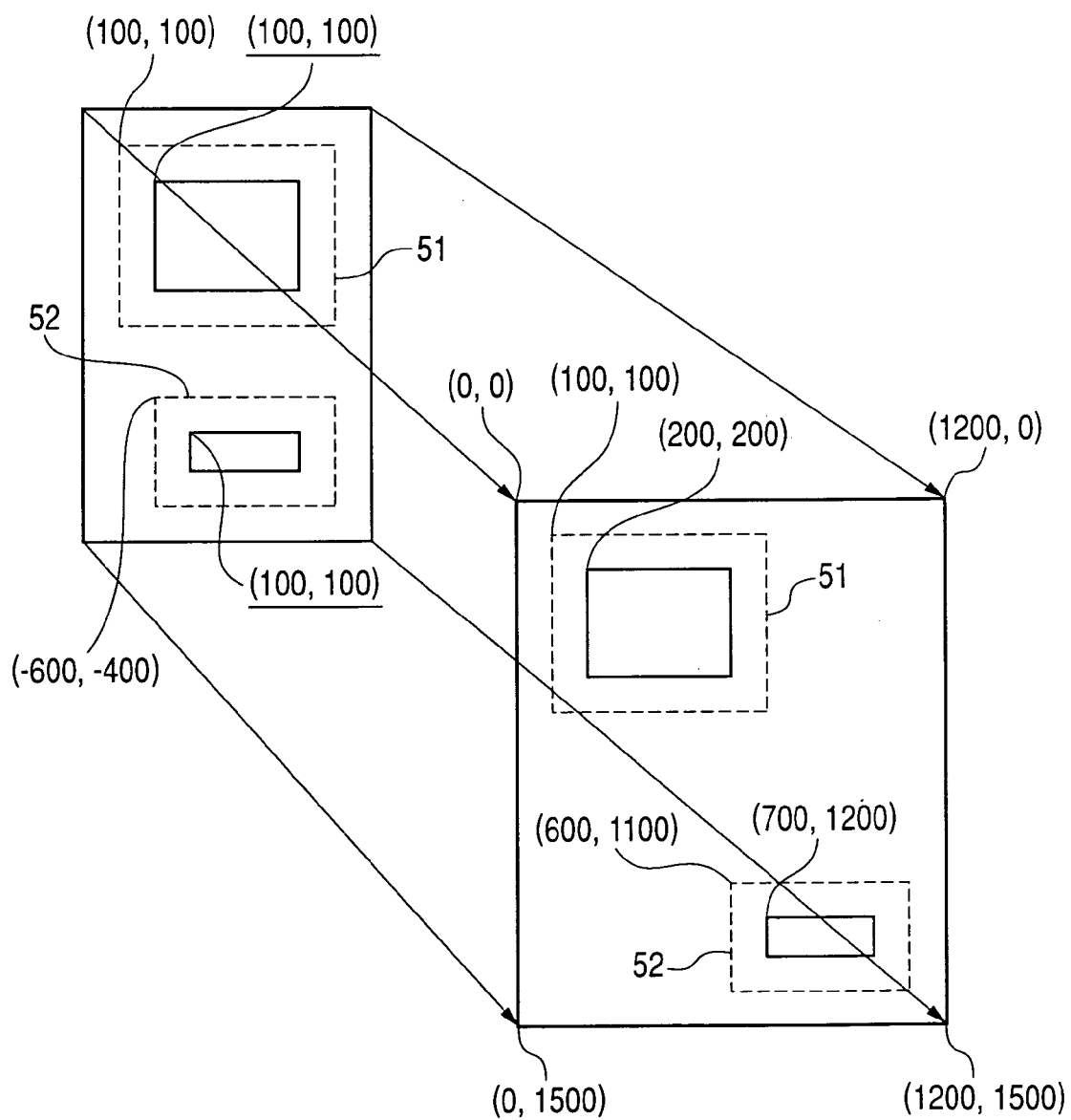
FIG. 6 is a drawing to describe conversion from a temporary coordinate system to an output coordinate system in the combining drawing system according to the first embodiment of the invention.

FIG. 6 is a drawing to describe the conversion for the absolute specification. In the conversion for the absolute specification, a parallel move of the rectangular frame defined in the temporary coordinate system is made in response to the print paper size on the coordinate plane defined in the output coordinate system. In the description to follow, it is assumed that the coordinates of the upper-left corner, the upper-right corner, the lower-left corner, and the lower-right corner of a drawing area are defined as (0, 0), (1200, 0), (0, 1500), and (1200, 1500) respectively by the output coordinate system. If the temporary coordinate system uses the upper-left corner as the origin point, the origin point of the temporary coordinate system is converted uniquely into (0, 0) independently of the size or the aspect ratio of the drawing space. The origin point (100, 100) of a group coordinate system 51 defined in the temporary coordinate system is converted into (0+100, 0+100), namely, (100, 100). The layout coordinates (100, 100) are converted into (200, 200). For example, if the temporary coordinate system uses the lower-right corner as the origin point, the origin point of the temporary coordinate system is converted into (1200, 1500). The origin point (−600, −400) of a group coordinate system 52 defined in the temporary coordinate system is converted into ((1200+(−600)), (1500+(−400))), namely, (600, 1100). The layout coordinates (100, 100) are converted into (700, 1200). The same is also applied if the upper-right corner or the lower-left corner is the origin point. If the absolute specification is made, the object can always be printed in the same size at the position 5 mm from the right margin and 5 mm from the lower margin, for example, if the print paper size differs.

Figure 7:
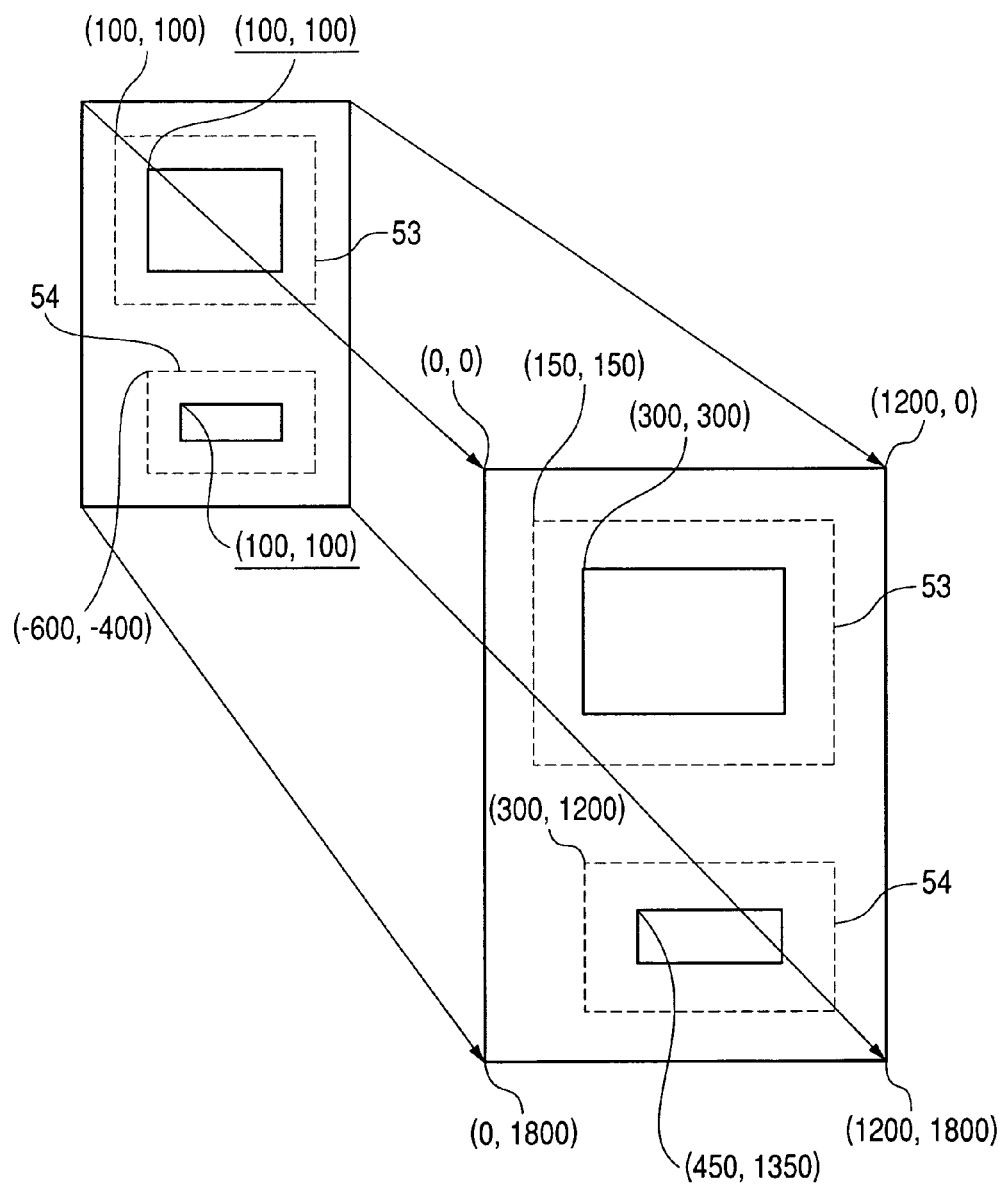
FIG. 7 is a drawing to describe conversion from a temporary coordinate system to an output coordinate system in the combining drawing system according to the first embodiment of the invention.

FIG. 7 is a drawing to describe the conversion for the relative specification. In the conversion for the relative specification, the rectangular frame defined in the temporary coordinate system is scaled up or down in response to the print paper size and a parallel move of the scaled-up or scaled-down rectangular frame is made in response to the print paper size on the coordinate plane defined in the output coordinate system. In the description to follow, the case where a template is set with a drawing area of A4 size (800 wide, 1200 long) as the reference is taken as an example. The origin point of the temporary coordinate system using the upper-left corner as the origin point is converted into (0, 0). The origin point of a group coordinate system is adjusted in response to the size of the drawing area unlike that in the absolute specification. Assuming that the coordinates of the upper-left corner, the upper-right corner, the lower-left corner, and the lower-right corner of the drawing area are (0, 0), (1200, 0), (0, 1800), and (1200, 1800) respectively, the lateral width of the drawing area is 3/2 times that of the A4 size (=1200/800), and the longitudinal width is also 3/2 times that of the A4 size (=1800/1200). In this case, the origin point (100, 100) of a group coordinate system 53 is converted into (0+100×3/2), (0+100×3/2), namely, (150, 150). The layout coordinates (100, 100) are converted into (300, 300). For example, the origin point of the temporary coordinate system using the lower-right corner as the origin point is converted into (1200, 1800). The origin point (−600, −400) of a group coordinate system 54 is converted into ((1200+(−600×3/2)), 1800+(−400×3/2)), namely, (300, 1200). The layout coordinates (100, 100) are converted into (450, 1350). The same is also applied if the upper-right corner or the lower-left corner is the origin point. If the relative specification is made, the position of the origin point of the group coordinate system and the size of the area of the group coordinate system are adjusted in response to the size of the drawing area, so that if the print paper size differs, print can be accomplished in the layout where the relative positional relationship between the objects is constant.

As is evident from the description given above, if the coordinates of the lower-right corner of the drawing area are found regardless of whether the group coordinate system is the absolute specification or the relative specification, the temporary coordinate system can be converted into the output coordinate system. That is, the conversion parameter is a value that can uniquely determine the coordinates of the lower-right corner of the drawing area; specifically it is the coordinates the lower-right corner of the drawing area, for example. In the embodiment, the conversion parameter is the coordinates of the lower-right corner of print paper uniquely determined as the paper size is specified.

Figure 8:
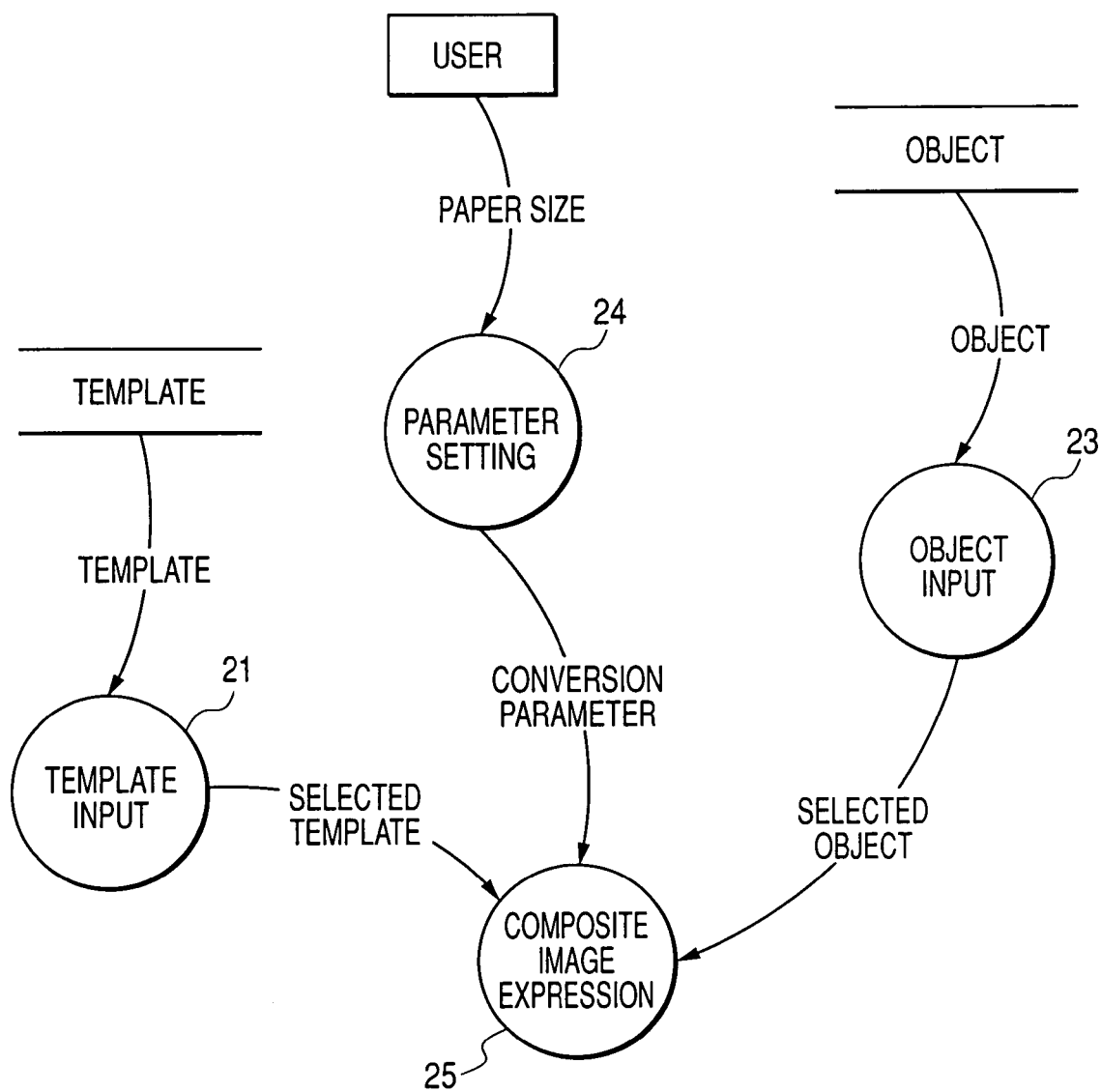
FIG. 8 is a data flowchart of the combining drawing system according to the first embodiment of the invention.

FIG. 8 is a data flowchart of the combining drawing program. As shown here, the combining drawing program causes the control section 15 to execute a template input process 21, an object input process 23, a parameter setting process 24, and a composite image expression process 25.

The template input process 21 is a process for displaying a menu to input a template. When "template" is selected out of a predetermined menu, the template input process 21 acquires all file names of the templates stored in the removable memory 4. Next, the template input process 21 displays a template selection menu 31 to select the file name of a specific template on the display 11 and then reads the template specified by the file name selected by the user from the removable memory 4 and outputs the template to the composite image expression process 25. The template selection menu 31 enables the user to easily add a template and therefore the user can print composite images in various layouts easily using the templates created by other persons.

Figure 9:
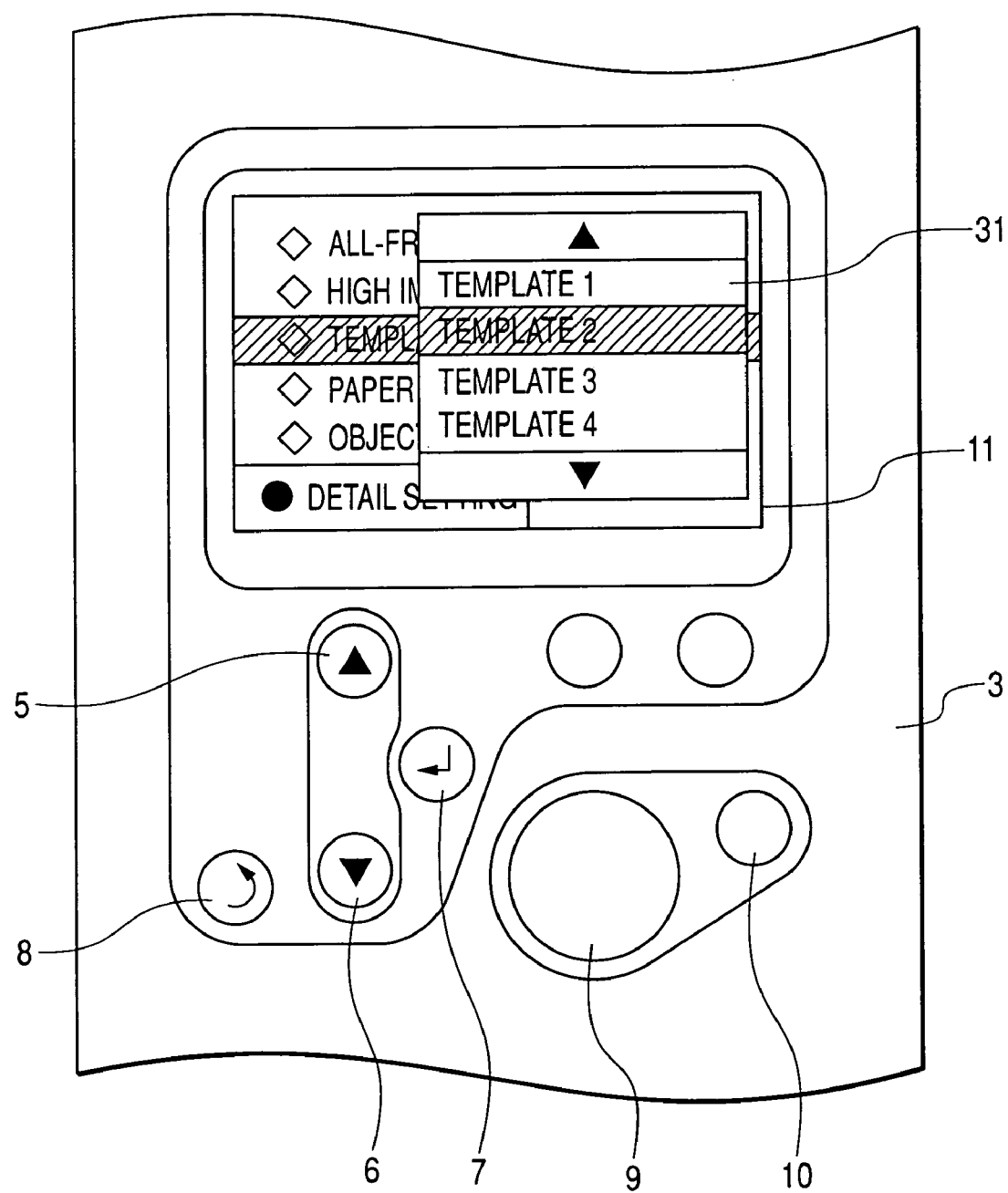
FIG. 9 is a drawing to show a template selection menu displayed by the combining drawing system according to the first embodiment of the invention.
Figure 10:
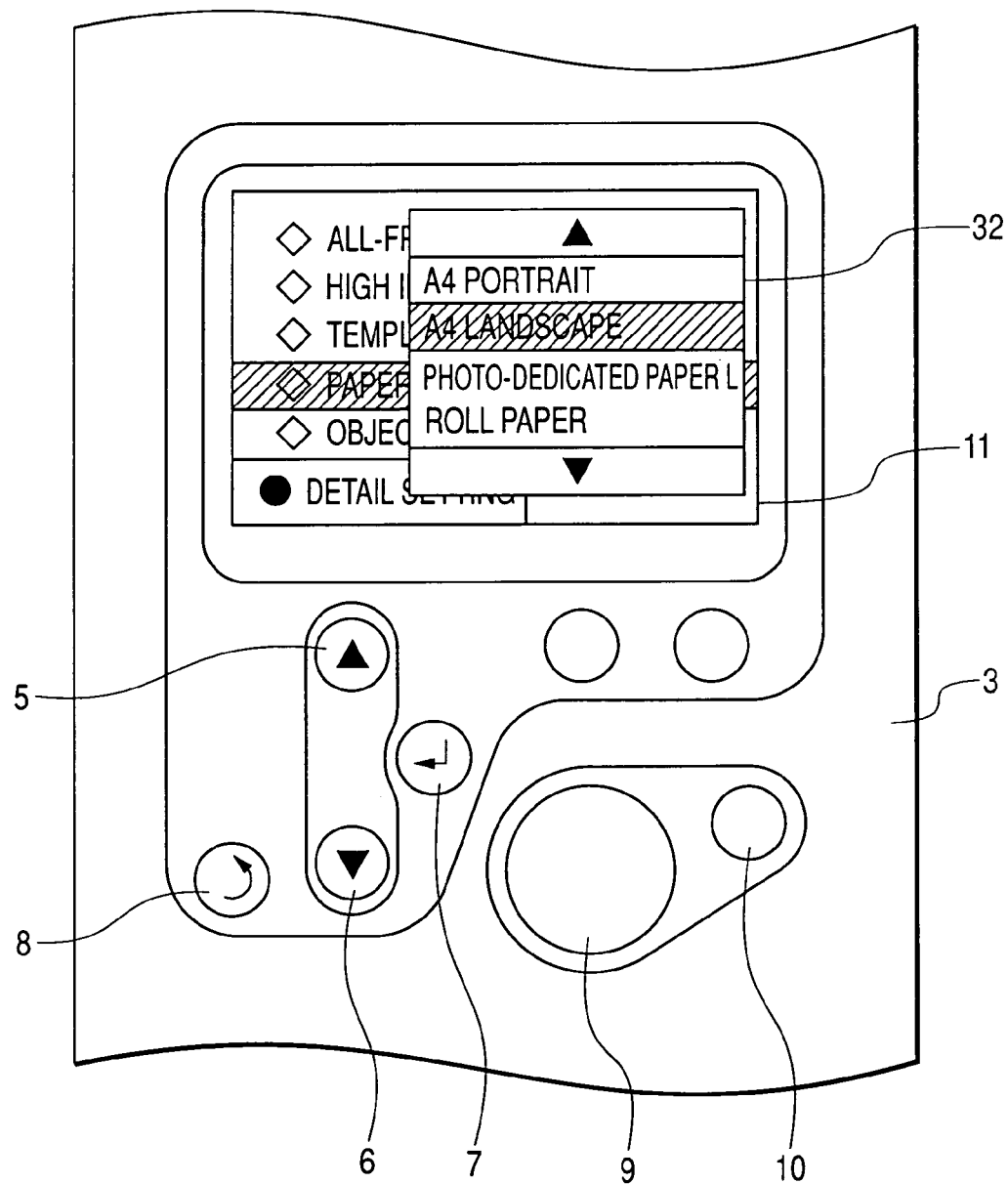
FIG. 10 is a drawing to show a paper size selection menu displayed by the combining drawing system according to the first embodiment of the invention.

FIG. 9 is a drawing to show the template selection menu 31. The user operates the upper switch 5 and the lower switch 6 to select one template and presses the determination switch 7. Accordingly, one template is selected.

The parameter setting process 24 is a process for setting a conversion parameter. The parameter setting process 24 displays a paper size selection menu 32 for selecting the paper size on the display 11 and then determines the coordinates of the lower-right corner of print paper based on the user-selected paper size and outputs the determined coordinates to the composite image expression process 25 as the conversion parameter.

The object input process 23 is a process for inputting the object output using a template. The object input process 23 acquires all file names of the objects recorded in the removable memory 4. Next, it gives serial frame numbers to the acquired file names of the objects. Next, the object input process 23 displays an object selection menu 33 to select the file name of a specific object on the display 11 and then reads the object specified by the user-selected file name from the removable memory 4 and outputs the object to the composite image expression process 25.

Figure 11:
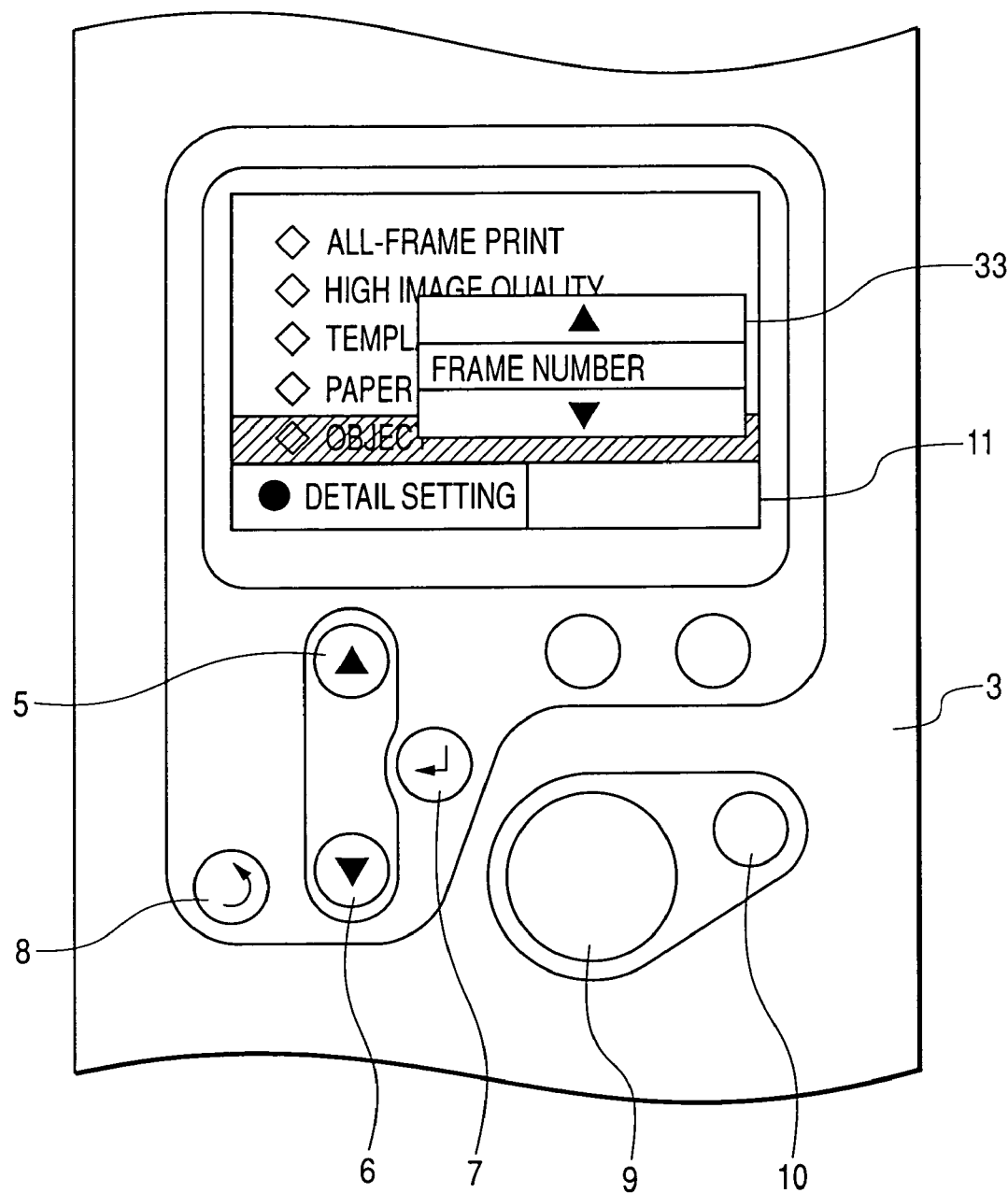
FIG. 11 is a drawing to show an object selection menu displayed by the combining drawing system according to the first embodiment of the invention.

FIG. 11 is a drawing to show the object selection menu 33. The object selection menu 33 in the example shown in the figure is a menu for selecting image data stored as an object and is an example of a menu for displaying the frame number to uniquely identify image data in the removable memory 4. The user operates the upper switch 5 and the lower switch 6 to select one of the frame numbers of objects and presses the determination switch 7. Accordingly, one object is selected. The user repeats the operation as many times as the number of the PhotoID entries defined in the selected template. The selected objects are assigned to PhotoID having higher priority in the selection order. That is, the earlier selected object is laid out in the layout coordinates with the smaller PhotoID value.

The composite image expression process 25 is a process for laying out the objects output from the object input process 23 in the layout coordinates defined in the output coordinate system based on the template and the conversion parameter to create a composite image and printing the created composite image on print paper. The composite image expression process 25 first reserves a work area corresponding to the print paper size in work memory 16. Specifically, for example, the composite image expression process 25 reserves an area as array variable Array (n, m) with n rows and m columns with image data as elements. Here, n is the value of the X parameter of the conversion parameter and m is the value of the Y parameter of the conversion parameter. It is assumed that values representing transparency are set in the initial values of all pixel data. Next, an object is laid out so that the upper-left pixel of the object is laid out at the position corresponding to the layout coordinates represented in the output coordinate system in the work area. Specifically, for example, it is assumed that the layout coordinates represented in the output coordinate system are (100, 100) and that the lower-right coordinates of the rectangular frame of the layout coordinates are (200, 400). Here, assuming that $100 \leq p \leq 200$, $100 \leq q \leq 400$ <, the value of the pixel data corresponding to the object is assigned to the element specified by Array (p, q). For example, the value of the upper-left pixel data of the object is assigned to Array (100, 100) and the value of the lower-right pixel data is assigned to Array (200, 400). Other elements are also assigned in a similar manner. Accordingly, the object is laid out in the work area. The object specified in FileName in the template 20 and the object associated with PhotoID are laid out in the layout coordinates, whereby one composite image is created. Next, the composite image expression process 25 causes the printer engine 18 to print the image represented by the created composite image data. Accordingly, the composite image is printed on print paper of the real drawing space, namely, is expressed.

Figure 12:
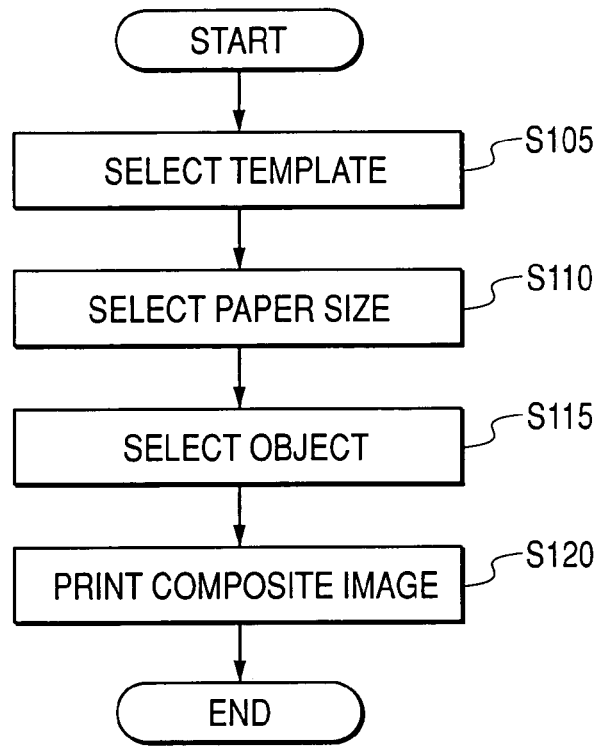
FIG. 12 is a flowchart to represent processing of the combining drawing system according to the first embodiment of the invention.

FIG. 12 is a flowchart to represent processing of the printer 1.

At S105, the template input process 21 displays the template selection menu 31. When the user selects the file name of a specific template and presses the determination switch 7, the template input process 21 outputs the template specified by the selected file name to the composite image expression process 25.

At S110, the parameter setting process 24 displays the paper size selection menu 32. When the user selects the paper size and presses the determination switch 7, the parameter setting process 24 sets the conversion parameter based on the selected paper size.

At S115, the object input process 23 displays the object selection menu 33. When the user selects the file name of a specific object and presses the determination switch 7, the object input process 23 outputs the object specified by the selected file name of the object to the composite image expression process 25.

At S120, the composite image expression process 25 creates a composite image and prints the composite image.

The processing of the printer 1 has been described. According to the printer 1 according to the first embodiment, layouts of a plurality of objects are defined in different temporary coordinate systems. For example, assume that object A entered by the user is to be printed at the position 10 mm from the left margin and 10 mm from the upper margin on A4 print paper and B4 print paper and at the same time, object B previously defined in a template is to be printed at the position 5 mm from the right margin and 5 mm from the lower margin on A4 print paper and B4 print paper. According to the printer 1, if the layout coordinates for laying out the object A and the layout coordinates for laying out the object B are defined in a template in different temporary coordinate systems, the same template can be used to lay out the objects A and B in the same size at the target position on A4 print paper and B4 print paper. That is, the template sets the layout for print paper of any size rather than the layout only for print paper of a specific size. Therefore, according to the printer 1 according to the first embodiment of the invention, the layout of a plurality of objects can be preset for an undefined drawing area.

The drawing space may be matched with the print paper area or may be made different from the print paper area. That is, an area retracted as much as a predetermined margin from the outer margin of print paper may be adopted as the drawing space or an area extending off the outer margin of print paper to the outside as much as a predetermined margin like the drawing space for printing a frameless image, for example, may be adopted as the drawing space. As the predetermined margin, the user-entered value may be used or the default value previously stored in the template or unit may be used.

(Second Embodiment)

In a second embodiment of the invention, an example wherein a composite image is displayed on a display will be discussed. Therefore, in the second embodiment, drawing space refers to a display area of the display and expression means display produced on the display. In the description that follows, drawing area refers to a rectangular area defined in the drawing space in an output coordinate system of a drawing space coordinate system, and a composite image is displayed in the drawing area. Parts of the second embodiment substantially identical with those of the first embodiment will not be discussed again.

Figure 13:
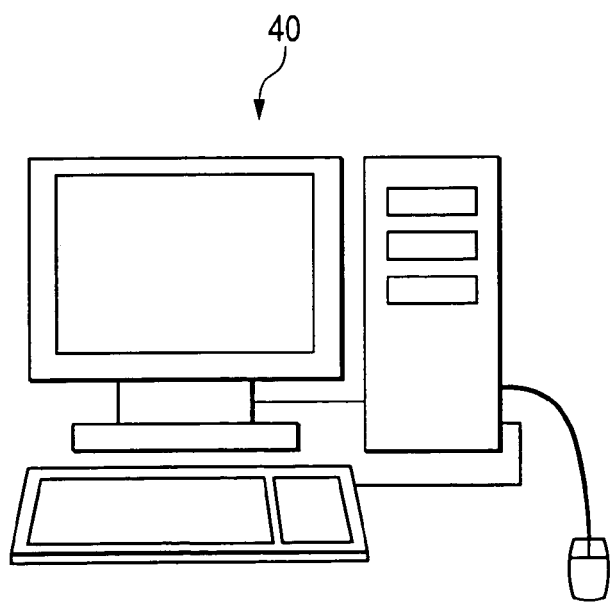
FIG. 13 is a perspective view to show the appearance of a combining drawing system according to a second embodiment of the invention.

FIG. 13 is a schematic drawing to show the appearance of a personal computer (PC) 40 as a combining drawing system according to the second embodiment of the invention. FIG. 14 is a block diagram of the PC 40.

The PC 40 includes a CPU 41, ROM 43, RAM 42, a hard disk (HD) 44, a display 48, a display control section 45, an operation section 46, an input section 47, etc., the components being connected by a bus 49.

The CPU 41 executes a control program stored in the ROM 43 and the operating system (OS) stored on the hard disk 44, thereby controlling the sections of the PC 40 and also executes a combining drawing program, a display driver, etc., according to the second embodiment of the invention, thereby displaying a composite image on the display 48. The ROM 43 is memory previously storing the minimum control program and data required for the CPU 41 to operate. The RAM 42 is memory for temporarily storing various programs, data, etc., and is memory used as the work memory in the second embodiment.

The hard disk 44 includes a hard disk controller (not shown) and stores the operating system (OS), the display driver, the combining drawing program, etc., as well as templates, objects, etc., input through the input section 47.

The display 48 is implemented as a CRT (cathode ray tube), an LCD (liquid crystal display), etc., and is controlled by the display control section 45. The display control section 45 includes VRAM, a drive circuit, etc. It displays the composite image stored in the VRAM on the display 48 under the control of the CPU 41.

The input section 47 reads data stored in removal memory 4 and stores the data in the RAM 42 under the control of the CPU 41. The removal memory 4 is a recording medium that can be attached to and detached from the input section 47; specifically it is card-type flash memory that can be attached to and detached from a digital camera, for example. A storage unit using a removal medium such as a flexible disk, a magneto-optical disk (MO), or a compact disk (CD-ROM) may be used as the input section. The PC 40 may include a network interface as input means for inputting an object through a network.

A parameter setting process 24 in the second embodiment is a process for performing processing of acquiring the resolution of the display from the OS. The parameter setting process 24 does not display a menu and outputs a conversion parameter to a composite image expression process 25 based on the resolution acquired from the OS. Accordingly, the conversion parameter is set.

The composite image expression process 25 in the second embodiment displays the created composite image on the display 48.

The operation of the PC 40 is substantially the same as the operation in the first embodiment except that display rather than print is performed.

In the first and second embodiments, the image drawing systems have been described by taking the printer and the PC as examples, but the image drawing system may be a projector, for example.

What is claimed is:

1. A combining drawing system comprising:
a storage unit which stores a template defining a plurality of temporary coordinate systems, the template defining a plurality of layout coordinates defined in any of the temporary coordinate systems, wherein each of the temporary coordinate systems represents a region;
a drawing region setting unit which sets a drawing region;
an output setting unit which sets a conversion parameter for converting the temporary coordinate systems into an output coordinate system which is a coordinate system of the drawing region set by the drawing region setting unit;
an object input which inputs one or more objects output using the template; and
an output unit which lays out the objects input through the object input unit in the layout coordinates defined in the output coordinate system based on the template and the conversion parameter to create a composite image and expressing the created composite image in the drawing region;
wherein each region of the temporary coordinate systems is within the drawing region so that the objects are laid out within the drawing region,
wherein the layout coordinates defined in the template are defined by any of group coordinate systems whose origin point is defined in any of the temporary coordinate systems, and
wherein said output means clips a plurality of objects laid out in the layout coordinates defined in the same group coordinate system based on a clipping mask defined for each of the group coordinate systems in the template.

* * * * *